United States Patent [19]

Sano et al.

[11] Patent Number: 4,916,580

[45] Date of Patent: Apr. 10, 1990

[54] BACK-LIGHT DEVICE

[75] Inventors: Toshihiko Sano, Ome; Soichiro Ogawa, Tokyo, both of Japan

[73] Assignee: Hitachi, Ltd., Tokyo, Japan

[21] Appl. No.: 247,650

[22] Filed: Sep. 22, 1988

[30] Foreign Application Priority Data

Sep. 24, 1987 [JP] Japan ................................ 62-237139

[51] Int. Cl.⁴ ........................................... G01D 11/28
[52] U.S. Cl. ..................................... 362/29; 362/216; 362/223; 362/355
[58] Field of Search ............... 362/260, 329, 331, 351, 362/355, 216, 222, 223, 23, 28, 29, 30, 33, 812; 350/314, 339 D; 368/84

[56] References Cited

U.S. PATENT DOCUMENTS 2,275,621  3/1942  Gardinor ................................ 362/29
4,222,435  9/1980  Kumagai ............................. 165/11.1
4,568,080  2/1986  Yokoi ................................. 273/85 G
4,766,524  8/1988  Ogawa et al. ......................... 362/29

FOREIGN PATENT DOCUMENTS 55-15126  2/1980  Japan .
61-34188  3/1986  Japan .

*Primary Examiner*—Ira S. Lazarus
*Assistant Examiner*—Richard R. Cole
*Attorney, Agent, or Firm*—Fay, Sharpe, Beall, Fagan, Minnich & McKee

[57] ABSTRACT

In order to make the brightness approximately uniform over a diffusion board, a back-light device is provided with a light transmission controlling film having a planar form in a shape of a projection of the lamp on the diffusion board. The film is disposed in parallel to the lamp axis between the lamp and the diffusion board.

18 Claims, 2 Drawing Sheets

BACK-LIGHT DEVICE

BACKGROUND OF THE INVENTION

This invention relates to a back-light system used in a liquid crystal television, a liquid crystal display, a general indication system, etc. and in particular to an inexpensive back-light system having a small unevenness, preventing locally high brightness intensity in the form of the back-light, and suitable for making the brightness uniform over a luminous surface.

A prior art device for making the brightness of a luminous surface uniform was such that black or silver dots or a plane film having a reflective layer whose transmission amount of light was approximately inversely proportional to the amount of light emitted from the luminous surface are provided on the back-light surface or the luminous plane surface, as disclosed in Japanese Utility Model Application Laid-Open No. 6134188 and JP-A-55-15126.

The prior art technique is disadvantageous from the point of view of reduction of the cost because the printed film or the direct printing on the lamp is costly and also from the point of view of the efficiency because the transmission of the light coming from the back-light source is lowered over the whole surface due to a film provided over the whole surface between the luminous surface and the back-light source. Further, both examples were lacking in mass-productivity and easiness of assembly, because the printing for preventing unevenness of brightness and the positioning of the film are difficult.

SUMMARY OF THE INVENTION

The object of this invention is to provide a back-light device free from the problems described above.

In order to achieve the above object, according to one aspect of the present invention, a back-light device has a lamp emitting visible rays, a diffusion board disposed on one side of the lamp in parallel to the lamp axis of the lamp in order to diffuse the emitted visible rays, a reflector disposed on the other side of the lamp for reflecting the emitted visible rays towards the diffusion board, and a light transmission controlling film having a plane planar form in the shape of a projection of the lamp on the diffusion board, the film being disposed in parallel to the lamp axis between the fluorescent lamp and the diffusion board in order to distribute the brightness of the emitted visible rays approximately uniformly over the diffusion board.

Unevenness of brightness and locally high brightness intensity on the luminous surface of the back-light system are produced by a pattern of relatively higher brightness, caused by a back-light source projected on the luminous surface. The pattern may be extremely high with respect to the other part of the luminous surface and may be discontinuous.

Therefore, it is possible to prevent the unevenness of brightness and the locally high brightness intensity of the form of the back-light source by mounting a light transmission control film such as a solid color film, a transparent film, a smoked film, etc. only on this part. In this construction, since it is necessary only to cut transparent or smoked films in the market, the price thereof is much lower than that of the printed film. Further, since the brightness is controlled only at a location, where the brightness is high, it is possible to avoid the reduction in the brightness at the other part of the luminous surface. In addition, since the mounting is effected by taking the lamp as the reference, deviations of the film with respect to the lamp are small and serious deficiencies due to unevenness of brightness produced during the mounting occur no more. Thus easiness in the mounting and the mass productivity are increased.

DESCRIPTION OF THE PREFERRED EMBODIMENTS

Figure 1:
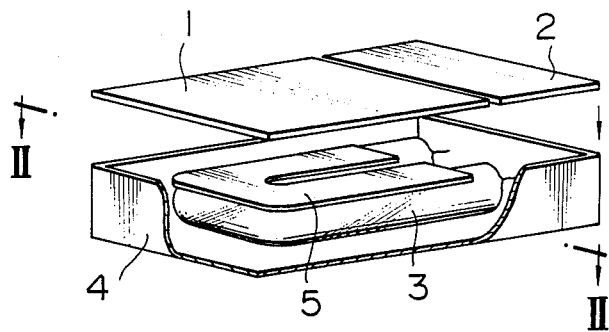
FIG. 1 is a perspective view of an embodiment of this invention.
Figure 4:
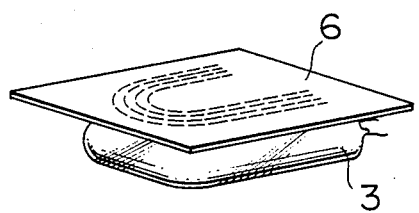
FIGS. 4 and 5 are perspective views illustrating prior art back-light devices.
Figure 5:
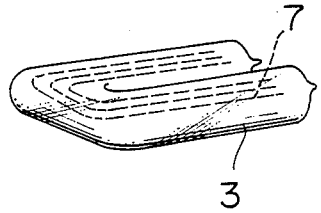
Figure 6:
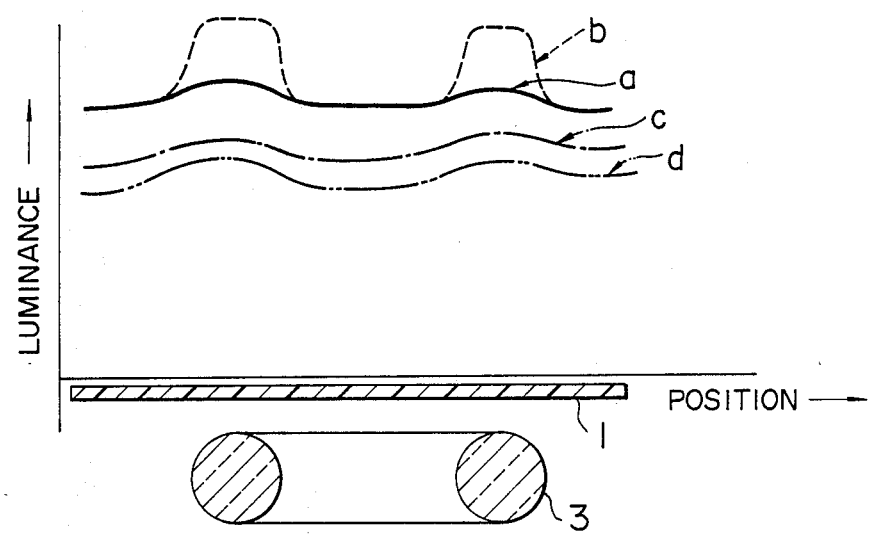
FIG. 6 shows graphs representing the distribution of the brightness along a line on the diffusion board (luminous surface) in a prior art device and a device according to this invention.

Hereinbelow an embodiment of this invention will be explained, referring to FIGS. 1 to 6. Usually a back-light system has a diffusion board (luminous surface) 1, which diffuses visible rays produced by a back-light source 3; a reflector 4, which reflects visible rays produced by the back-light source 3 towards the diffusion board 1 and a guide plate 2, a U-shaped fluorescent lamp acting as the back-light source 3 being disposed therein, as indicated in FIG. 1. The diffusion board 1 is mounted so as to be parallel to the lamp axis of the fluorescent lamp 3. With this structure as it is, in a curve representing the distribution of the brightness along a line on the surface of the diffusion board (luminous surface) 1, which is perpendicular to the projection of the lamp axis on the same surface, the brightness is extremely high at the portion, in opposition to the rear surface of which the U-shaped fluorescent lamp 3 is disposed, as indicated by the curve b in FIG. 6, and because of this extreme unevenness of brightness, the form of the U-shaped lamp 3 projected on the diffusion board (luminous surface) 1 clearly appears thereon. This arrangement is disadvantageous for a back-light system. In order to suppress this extremely uneven brightness, in a prior art device, a pattern film 6 is disposed above the U-shaped fluorescent lamp 3, as indicated in FIG. 4, or a pattern printing 7 is disposed above the U-shaped fluorescent lamp 3, as indicated in FIG. 5, so as to obtain a uniform plane light source. With these constructions, it is difficult to reduce the cost, and in addition they have a disadvantage that the pattern absorbs light. Further, by the construction indicated in FIG. 4, positional deviations of the film can take place and in addition the transparent part of the film, where there is no pattern, gives rise also to absorption and reflection of light. As a result, the brightness is represented by curve d for the construction indicated in FIG. 4 and by curve c for that indicated in FIG. 5, as indicated in FIG. 6. As it is clearly seen therefrom, the brightness was lowered and also the efficiency was low.

Figure 2:
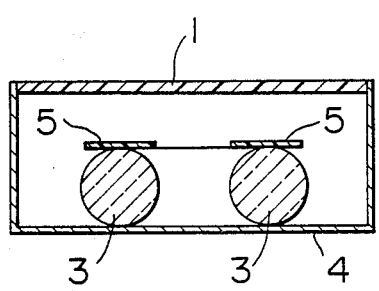
FIG. 2 is a cross-sectional view of the device indicated in FIG. 1 along the line II—II.
Figure 3:
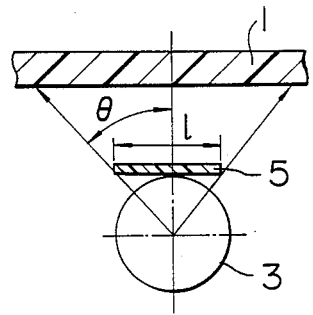
FIG. 3 is a scheme for explaining how this invention is realized.

According to an embodiment of this invention, a solid color light transmission control film 5 such as a transparent film is cut into a form of the U-shaped lamp 3 projected on the diffusion board (luminous surface) 1 and mounted, as indicated in FIG. 1. The transparent film 5 is disposed so as to be parallel to the lamp axis of the fluorescent lamp, as indicated in FIG. 2, which is a cross-sectional view along the line II—II in FIG. 1. Since usually the transparent film 5 has a light transmission coefficient of 80–92%, the light intensity is reduced only at the part, where the brightness is extremely high. Consequently a distribution of the brightness indicated by curve a in FIG. 6 can be obtained. According to measurements, it is found that a suitable transparent film 5 is in an angular region of $\theta = 30°–60°$ from the center of the cross-section of the U-shaped fluorescent lamp 3 with respect to the normal to the diffusion board (luminous surface) 1 passing therethrough and thus the width e thereof can be calculated by using $\theta = 30°–60°$. Consequently the transparent film 5 may be either in contact with the U-shaped fluorescent lamp 3 or distant therefrom and it is usable, if the angular condition of $\theta = 30°–60°$ is satisfied. In the case where the reflector 4 is large or a thin type system is designed, the unevenness in the brightness becomes further remarkable. In this case, a countermeasure can be taken by using a uniform film, whose light transmission is more or less controlled, instead of the transparent film 5. In this case also, since the countermeasure is taken not by printing a calculated pattern, but by using a uniform film, i.e. solid color smoked film in the market, etc., an inexpensive plane light source can be obtained. Further, by using this construction, since positional deviations of the film become smaller and the mounting precision becomes less severe, the easiness of assembly and the mass productivity are increased.

As explained above an inexpensive plane light source can be obtained, for which the efficiency of light utilization is high, the assembling is easy and the mass productivity is high.

We claim:

1. A back-light device comprising:
   a lamp emitting visible light rays;
   a diffusion board disposed on one side of said lamp in parallel to a lamp axis of said lamp in order to diffuse the emitted visible light rays;
   a reflector disposed on another side of said lamp for reflecting the emitted visible light rays towards said diffusion board; and
   a light transmission controlling film having a planar form in a shape of a projection of said lamp on said diffusion board, said film having a uniform light transmission coefficient and being disposed in parallel to said lamp axis between said lamp and said diffusion board in order distribute said brightness of said emitted visible light rays approximately uniformly over said diffusion board.

2. A back-light device according to claim 1, wherein said light transmission controlling film is disposed in contact with said lamp.

3. A back-light device according to claim 2, wherein said light transmission controlling film is a transparent film.

4. The back-light device according to claim 3, wherein said lamp is a fluorescent lamp.

5. A back-light device according to claim 2, wherein said light transmission controlling film is a smoked film.

6. The back-light device according to claim 5, wherein said lamp is a fluorescent lamp.

7. A back-light device according to claim 2, wherein said lamp is a U-shaped fluorescent lamp.

8. The back-light device according to claim 2, wherein said lamp is a fluorescent lamp.

9. A back-light device according to claim 1, wherein said light transmission controlling film is a transparent film.

10. The back-light device according to claim 9, wherein said lamp is a fluorescent lamp.

11. A back-light device according to claim 1, wherein said light transmission controlling film is a smoked film.

12. The back-light device according to claim 11, wherein said lamp is a fluorescent lamp.

13. A back-light device according to claim 1, wherein said lamp is a U-shaped fluorescent lamp.

14. A back-light device according to claim 1, in which said light transmission control film has a shape substantially symmetrical with respect to the lamp axis and has a width such that the angle between a plane containing an edge of said film and the lamp axis and a plane perpendicular to said diffusion board and passing through the lamp axis is substantially in a range of 30° to 60°.

15. The back-light device according to claim 14, wherein said lamp is a fluorescent lamp.

16. A back-light device according to claim 1, in which said light transmission control film has a light transmission coefficient of substantially in a range of from 80% to 92%.

17. The back-light device according to claim 16, wherein said lamp is a fluorescent lamp.

18. The back-light device according to claim 1, wherein said lamp is a fluorescent lamp.

* * * * *